Sept. 16, 1924.                              1,509,043
L. KOBASH
BRINE TANK CONSTRUCTION
Filed Jan. 26, 1924            2 Sheets-Sheet 1
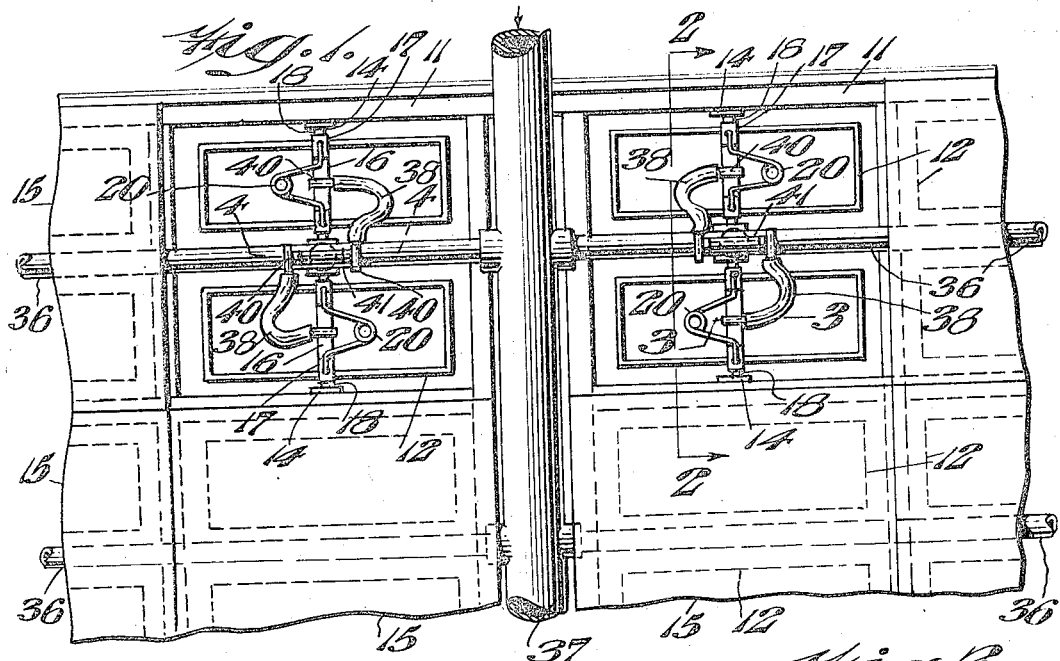
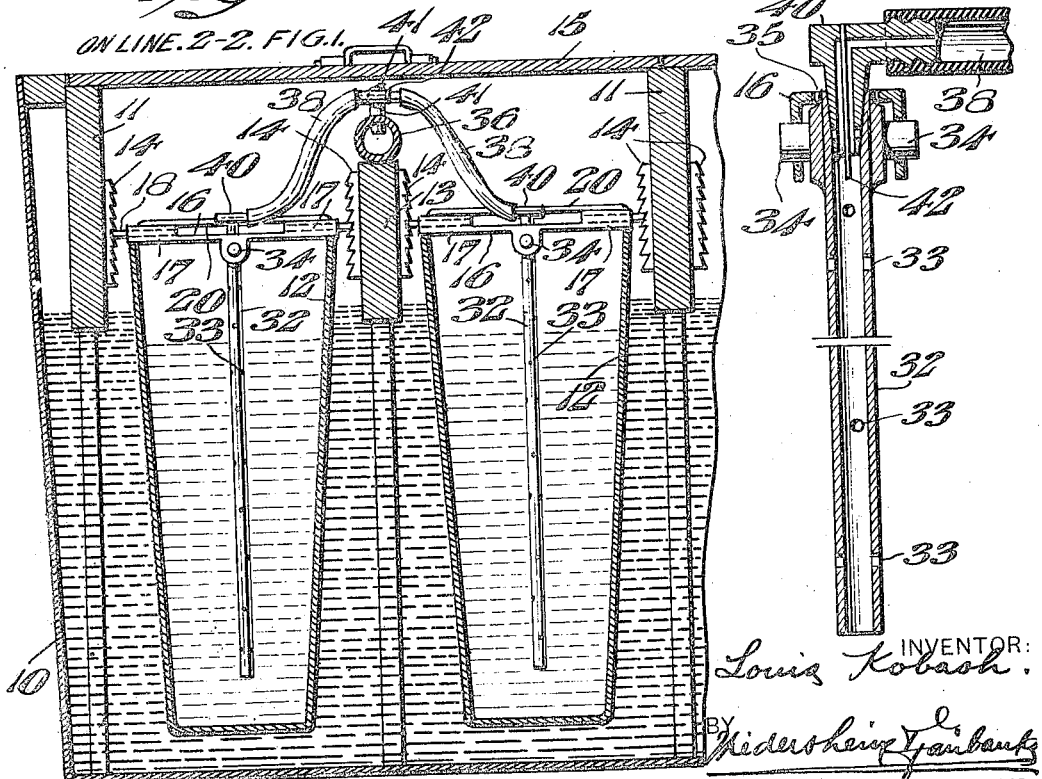
INVENTOR:
Louis Kobash.
BY
ATTORNEYS Sept. 16, 1924.                    1,509,043
L. KOBASH
BRINE TANK CONSTRUCTION
Filed Jan. 26, 1924    2 Sheets-Sheet 2
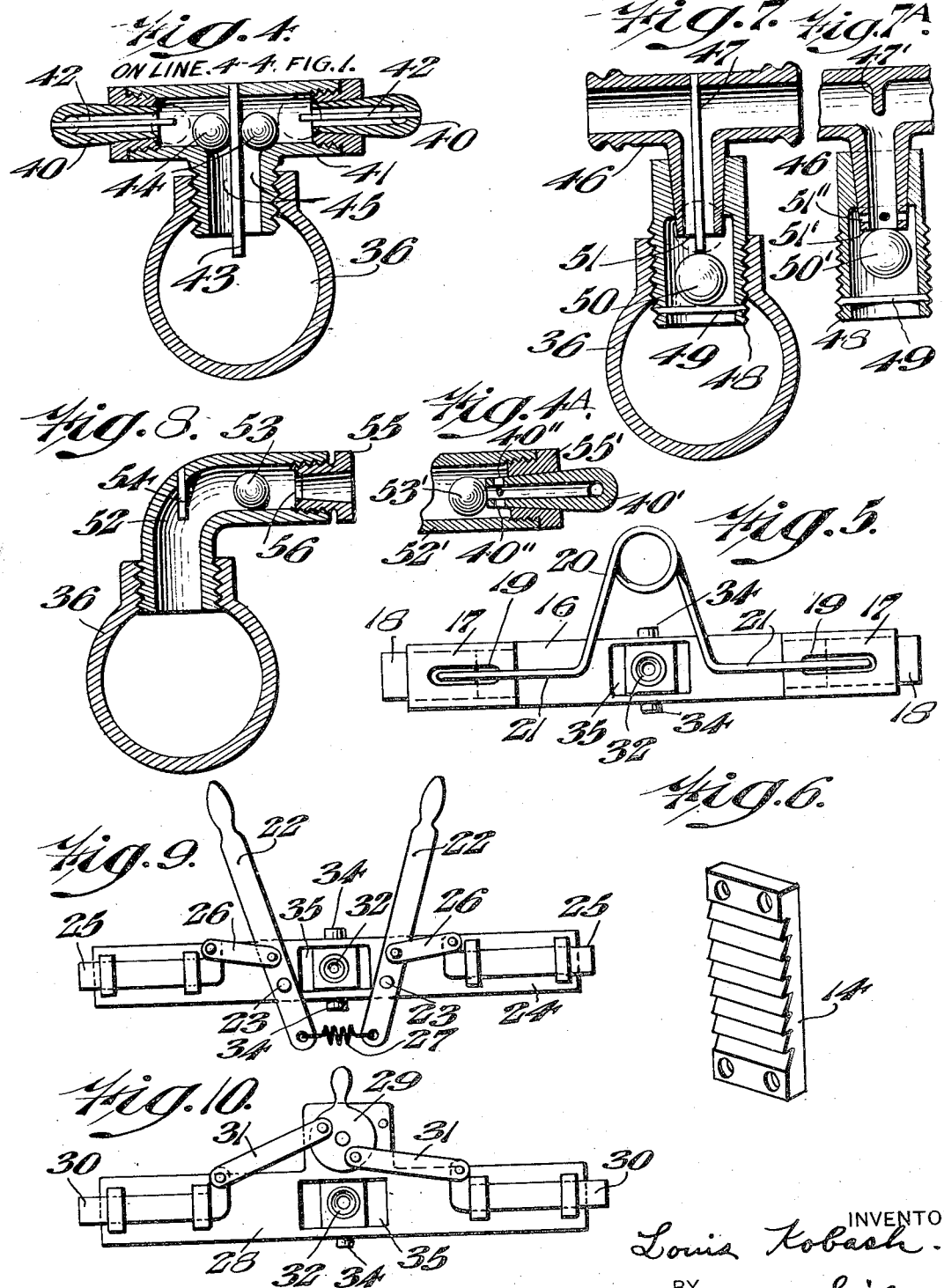

Patented Sept. 16, 1924.

1,509,043

UNITED STATES PATENT OFFICE.

LOUIS KOBASH, OF MAPLE SHADE, NEW JERSEY.

BRINE-TANK CONSTRUCTION.

Application filed January 26, 1924. Serial No. 688,646.

*To all whom it may concern:*

Be it known that I, LOUIS KOBASH, a citizen of the United States, residing at Maple Shade, in the county of Camden and the State of New Jersey, have invented a certain new and useful Brine-Tank Construction, of which the following is a specification.

The leading object of the present invention is to provide a novel arrangement and combination of freezing cans within a brine containing tank whereby said cans individually may be vertically adjusted and held down with respect to the brine content by simple, efficient and inexpensive parts. A further object resides in the provision of a manually operable, adjusting device for attaining the results sought by said leading object. A still further object resides in the provision of valved means for automatically shutting off the supply of air when the connection between the source of air supply and freezing can is disconnected. Other and further objects not at this time appearing will be hereinafter referred to.

The invention consists of the novel construction hereinafter described and finally claimed.

The nature, characteristic features and scope of the invention will be more fully understood from the following description taken in connection with the accompanying drawings forming part hereof, and in which:

Fig. 1, is a fragmentary view in plan of apparatus embodying features of the invention.

Fig. 2, is a view in section taken upon the line 2—2 of Fig. 1.

Fig. 3, is a view in section taken upon the line 3—3 of Fig. 1.

Fig. 4, is a view in section taken upon the line 4—4 of Fig. 1.

Fig. 4ᴬ, illustrates a modified form thereof.

Fig. 5, is a top or plan view of one of the can retaining devices shown in Fig. 1.

Fig. 6, is a perspective view of one of the rack-bars shown in Fig. 2.

Figs. 7 and 7ᴬ are views in section of further modified forms of valve arrangement.

Fig. 8, is a similar view of still another modified form.

Fig. 9, is a view in plan of a modified form of can retaining device, and

Fig. 10, is a similar view of still another modified form.

For the purpose of illustrating my invention I have shown in the accompanying drawings several forms thereof which are at present preferred by me, since the same have been found in practice to give satisfactory and reliable results, although it is to be understood that the various instrumentalities of which my invention consists can be variously arranged and organized and that my invention is not limited to the precise arrangement and organization of the instrumentalities as herein shown and described.

Referring to the drawings in detail, the numeral 10 designates a plurality of tanks or receptacles for containing brine, which tank is subdivided by frames or upright beams 11, to provide compartments to receive pairs of freezing cans 12. In addition to frame 11, there is arranged centrally of each compartment occupied by a pair of cans, an additional intermediate beam or partition 13, best seen in Fig. 2. Fixed to each portion 13, upon opposite sides thereof, and upon each side of frame 11, (except end frames) are rack-bars 14, see Fig. 6. The tops of frames 11, form rests to receive tank covers 15. Arranged to rest upon the top of each can 12 to co-act with rack-bars 14 is a manually operable device, for positioning a can at a desired height with respect to brine. I have in mind various forms of devices for this purpose as for instance the embodiments shown in Figs. 5, 9 and 10. Referring to the construction shown in Fig. 5, the numeral 16 denotes a bar arranged to rest upon a can 12 which bar is provided with keeper 17 through which work bolts 18 for engaging the rack-bars 14. The keepers 17 are slotted as at 19. The numeral 20 designates a compressible member as a coiled wire, the free ends 21 of which each engage a bolt 18, the slot permitting such connection. By compressing the coiled portion of the wire the bolts may be readily withdrawn from the rack-bars. In Fig. 9, compressible levers 22, pivoted at 23 to bar 24 and connected to bolts 25 by pivotal links 26 are employed for the same purpose. The levers 22 are normally spread apart at their outer ends by a spring 27. In Fig. 10, the bar 28 has mounted thereon an eccentric 29 connecting which and bolts 30 are pivotal links 31 for attaining the same results as the devices shown in Figs. 5 and 9. Pivoted as at 34 to the bar which rests upon a can top is an air supply tube 32, perforated as at 33. The bar is slotted upon its top as at 35 to permit connection of tube 32 through tubing to a branch air supply pipe 36, in communication with a main supply pipe 37 common to all branch connections, see Fig. 1. The tubing is designated 38, and is of rubber. Each end of a tube has fitted thereto a metal T-shaped nipple 40, having an angular air passage therethrough, see Fig. 3. One nipple 40 is fitted to a tube 32 and the other nipple is fitted to a T-union 41, supported by a branch supply pipe 36. The nozzles of tubes 38 are interiorly provided with pins 42, and the T-union 41 is provided with a central, interiorly disposed pin 43. Within the T-union are located valves in the form of a pair of balls 44—44. Normally these balls rest against pin 43 and close the ports 45—45 of the T-union, as clearly shown in Fig. 36. With the pressure of air passing through branch pipe 36 the valves move from their seats but cannot close the nipple ports because of the pins 42. However, should nipples 40 be removed from T-union 41 the balls will then be forced to close the openings at the ends of the T-union and thereby prevent waste of air. A modified form of construction is disclosed in Fig. 7, in which the T-union is designated 46 and the central pin 47. The lower or tapered end of the T-union is fitted to a hollow plug 48, which in turn is screw-threaded to a branch air pipe 36. A horizontal pin 49 is arranged in plug 48 to normally support a ball-valve 50. In this case removal of T-union allows air pressure to close the central port 51, pin 47 normally tending to keep ball free of said port. In Fig. 8, an L-union 52 is employed upon branch pipe 36. A ball-valve 53 is prevented from escape by means of a pin 54. Obviously when a nipple as 40 is attached to the thimble 55, the pin 42 of such nipple prevents free flow of air but with removal of such nipple, air pressure forces ball 53 to close port 56.

In Fig. 4ᴬ the thimble 55' of L-union 52' has fitted thereto a nipple 40', having air openings 40'' at the inner end thereof. By this construction, if the ball 53' is accidentally forced against the end of nipple 40', air may still pass to the nipple, although if nipple 40' be removed, the ball 53' closes the end of thimble 55' to prevent egress of air.

In Fig. 7ᴬ, instead of pin 47, a nib 47' is employed in T-union 46 and air openings 51'' are provided adjacent port 50'. In operation it is apparent that air may still pass through openings 51'' even if port 50' be accidentally closed. Of course, if T-union 46 is removed ball 50' closes the end of plug 48.

It will now be apparent that I have devised a novel and useful construction which embodies the features of advantage enumerated as desirable in the statement of the invention and the above description and while I have in the present instance shown and described the preferred embodiments thereof which have been found in practice to give satisfactory and reliable results, it is to be understood that the same are susceptible of modification in various particulars without departing from the spirit or scope of the invention or sacrificing any of its advantages.

Having thus described my invention, what I claim as new and desire to secure by Letters Patent, is:

1. In combination a brine containing tank, a frame arranged in said tank to provide a freezing-can receiving compartment, a rack-bar fitted to opposed faces of said frame, a plurality of teeth on said rack bar to provide for the vertical adjustment of said can, a freezing can, and means including shiftable bolts positioned upon the can top for co-acting with said rack-bars to maintain said can properly immersed at predetermined heights.

2. In combination a brine containing tank, a frame arranged in said tank to provide a freezing-can receiving compartment, a rack-bar fitted to opposed faces of said frame, a freezing can, a member arranged upon said can and provided with shiftable bolts for engaging with said rack-bars to maintain said can properly immersed, and means connected with said bolts for simultaneously withdrawing said bolts.

3. In combination a brine containing tank, a frame arranged in said tank to provide a freezing-can receiving compartment, a rack-bar fitted to opposed faces of said frame, a freezing can, a member arranged upon said can and provided with shiftable bolts for engaging with said rack-bars to maintain said can properly immersed, a perforated tube for supplying air to said can pivotally carried by said member, and means for supplying air to said tube.

4. In combination, a brine containing tank, including a freezing can receiving compartment, stationary rack-bars secured to opposed walls of said compartment, a freezing can, a plurality of teeth on said rack bars to provide for the vertical adjustment of said can, horizontally disposed opposed shiftable means positioned upon the can top for co-acting with the teeth of said stationary rack-bars to maintain said can properly immersed at predetermined heights and means for operating said shiftable means.

5. In combination, a brine containing tank, including a freezing can receiving compartment, stationary rack-bars secured to opposed walls of said compartment, a freezing can, horizontally disposed opposed shiftable means positioned upon the can top for co-acting with said stationary rack-bars to maintain said can properly immersed at predetermined heights and resilient means intermediate said shiftable means for simultaneously actuating said shiftable means into and out of engagement with said stationary rack-bars.

6. In a device of the character stated, a tank, a pair of vertically disposed beams therein, an intermediate vertically disposed beam, positioned between said pair of beams, upright fixed rack bars provided with teeth on opposite sides of said intermediate beam, oppositely disposed fixed rack bars secured to the inner face of said pair of beams and having teeth facing the teeth of the rack bars supported on said intermediate beam, ice cans positioned in the spaces between said beams, oppositely disposed bolts on the tops of said ice cans and adapted to engage said rack teeth and means for actuating said bolts.

In testimony whereof, I have hereunto signed my name.

LOUIS KOBASH.

Witnesses:
 E. HAYWARD FAIRBANKS,
 N. BUSSINGER.